United States Patent [19]

Heuze

[11] 3,771,579

[45] Nov. 13, 1973

[54] UNIVERSAL WOOD WORKING MACHINE

[76] Inventor: Maurice Paul Heuze, 2, rue de Saint Front, Domfront, France

[22] Filed: Nov. 22, 1971

[21] Appl. No.: 201,033

[30] Foreign Application Priority Data
Dec. 4, 1970 France .............................. 7043671

[52] U.S. Cl. .................... 144/1 C, 29/560, 144/1 G
[51] Int. Cl. ............................................. B27c 9/04
[58] Field of Search ................. 144/1, 39; 29/26 A, 29/560

[56] References Cited
UNITED STATES PATENTS

| | | | |
|---|---|---|---|
| 2,927,612 | 3/1960 | Edgemond, Jr. et al. | 144/1 C |
| 2,089,074 | 8/1937 | Sharp | 144/1 G |
| 3,352,334 | 11/1967 | Hunn | 144/1 |
| 2,744,550 | 5/1956 | Knapp | 144/1 |
| 2,661,037 | 12/1953 | McGihon | 144/1 C |
| 2,623,269 | 12/1952 | Goldschmidt | 29/560 |

Primary Examiner—Andrew R. Juhasz
Assistant Examiner—W. D. Bray
Attorney—Linton & Linton

[57] ABSTRACT

A machine-tool for wood, of the type with a plurality of tool-holding shafts entrained by a single motor, and which can plane, square up, rough -plane, saw, shape and mortise, and has two parallel tables, characterized in that the displacement of the two tool-holding shafts, in order to bring them into working position, takes place in planes perpendicular to the said tables, and is insured by a single control, said shafts being entrained by a single motor integral with the mobile frame.

8 Claims, 9 Drawing Figures

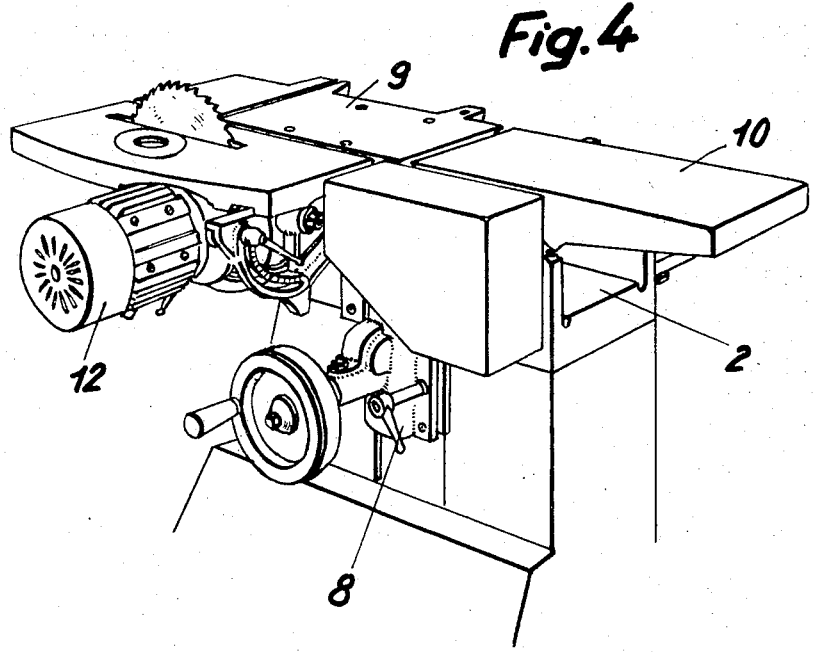
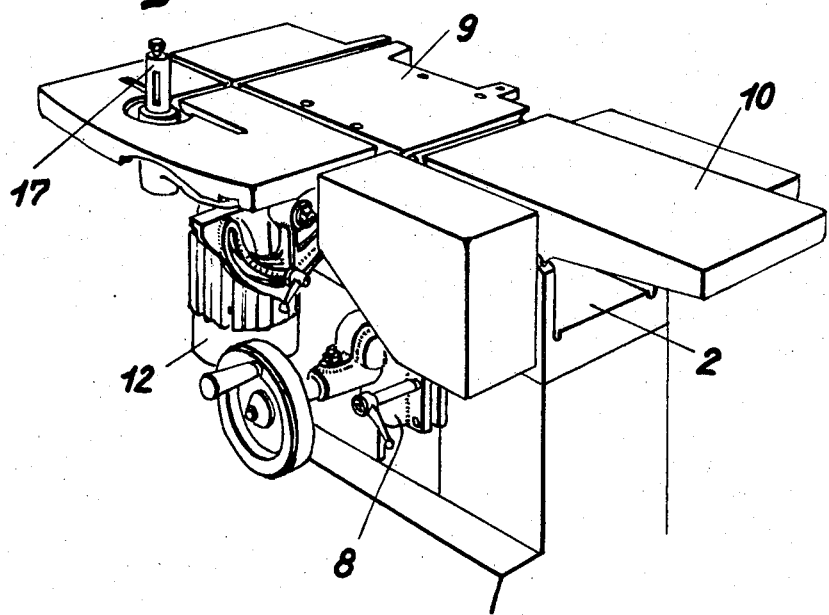

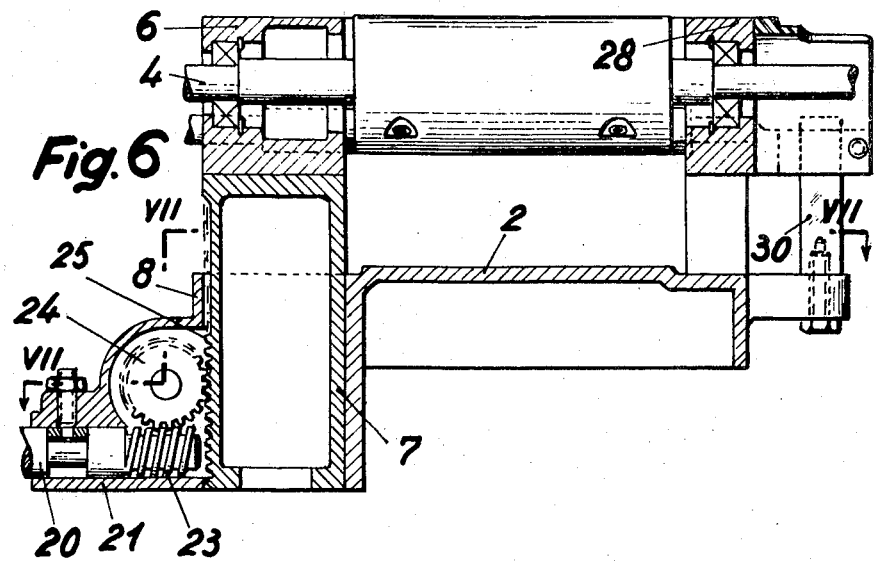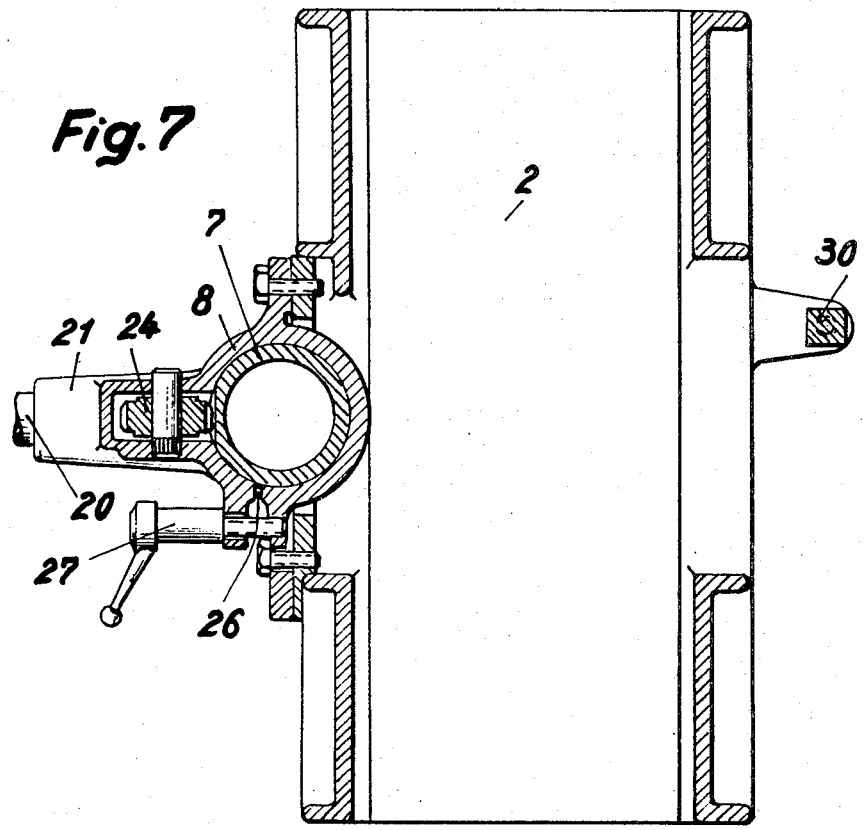

UNIVERSAL WOOD WORKING MACHINE

DESCRIPTION

The present invention is concerned with a machine tool for working wood. The characteristics and advantages of the invention are set forth in the description which follows, which is made in reference to the attached drawings by way of indicative example only, in which:

FIG. 4 is a view similar to FIG. 2, but showing the use of the circular saw.

FIG. 5 is a view similar to FIG. 2, but showing the machine in shaping position.

FIG. 6 is a partial view in vertical section, taken through the shaft supporting the squaring-up and planing tool.

FIG. 7 is a sectional view taken along the broken line VII—VII in FIG. 6.

Figure 1:
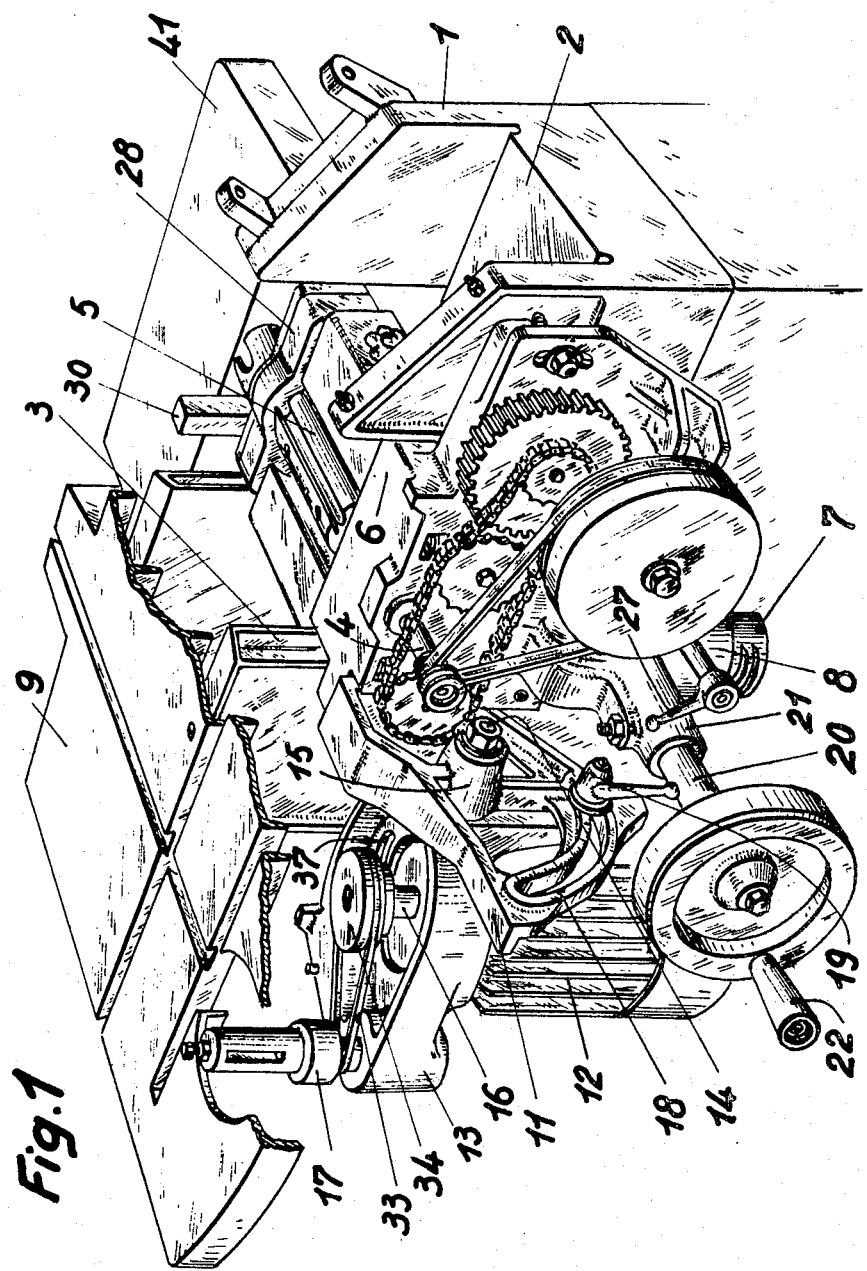
FIG. 1 is a perspective view of the machine which is the subject of the present invention with the upper table being partly cut away.

In reference to the drawings, and according to one method of embodiment, the machine is constituted by a frame 1, with a U-shaped section, whereof the middle part 2 constitutes the table of the planer.

Frame 1 has a transverse slot 3 in which there can move a shaft 4, supporting the squaring-up or planing tool 5, whereof one of the bearings 6 is integral with the upper part of a column 7 which can slide axially in a sleeve 8 integral with one of the lateral faces of said frame.

On frame 1 there is fixed a table 9, forming a supporting surface during the sawing, shaping and squaring-up operations, and, with a view to carrying out the latter operation, a pivotal table 10 is added to table 9.

Shaft 4, by means of a belt, pulleys, chain and sprockets drives the usual pair of rollers designed to insure the entrainment of the materials during the planing.

Bearing 6 has an extension 11 supporting an electric motor 12 fixed on a platen 13 which has a journal 14 that can pivot in a bearing 15 in said extension 11 with the axis of said journal being perpendicular to the shaft 16 of the motor and to the shaft 4.

Platen 13 forms the bearing of a shaft 17 designed to receive a circular saw or a shaping wheel with said shaft being parallel to that of the motor 12. By rotation of the platen, it is possible to tilt shaft 17 as desired and as a matter of fact, the amplitude of rotation is limited to 90°, one of the two extreme positions corresponding to vertical shaping, while the other positions correspond to various inclinations of the saw or shaper.

Extension 11 which is a corner piece, has a circumferential opening 18 which, by means of a screw and nut 19 connected to motor 12, with manual operation lever, makes it possible to immobilize motor 12 at the desired inclination.

Manipulation of the moveable frame supporting shafts 4 and 17 including column 7, bearing 6, extension 11 and platen 13, is insured by a shaft 20 immobilized in translation in a radial extension 21 of sleeve 8 and controlled by a crank 22. Shaft 20 has at one end, an endless screw 23 engaging with a tangential pinion 24 meshed with the teeth of a rack 25 on column 7.

Sleeve 8 has a longitudinal slot 26 which permits, for example by means of a manually operated screw 27, to clamp said sleeve on column 7 to insure immobilization of the latter.

With shaft 4 overhanging, its free end will pivot in a bearing 28 connected to bearing 6 by crossbraces, not shown, and including a fork 29 engaged on a vertical guide 30 with the immobilization of the said fork on said guide being insured by a screw 31. In so doing, the two ends of shaft 4 are held perfectly during the planing and squaring-up.

Guide 30 is graduated to permit adjustment of the height of shaft 4.

The entrainment of shafts 4 and 17 from motor 12 is insured by two belts 32 or 33, belt 32 entraining shaft 4, and belt 33 entraining shaft 17 with the pulley 34 of the motor shaft being designed to receive one belt at a time. This very simple device makes it possible to obtain, at low cost, a high degree of security in the running and utilization of the machine inasmuch as it is not possible to entrain the two tool-holding shafts at the same time.

Figure 9:
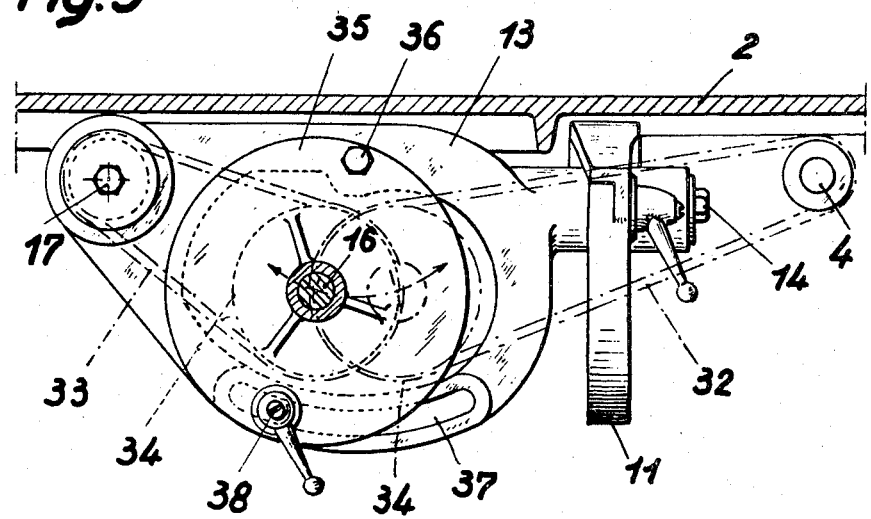
FIG. 9 is a partial view showing the device for applying the tension to the drive belts of the tool-holding shafts.

FIG. 9 shows the simple way of tensioning belts 32 and 33. To do so, the face 35 of the motor support is articulated at 36, toward its perimeter, on platen 13, and has a circumferential opening 37 which permits, with the aid of a manually operated screw 38, and a prisoner nut, or vice-versa (not shown), to immobilize said face on the platen 13.

Figure 2:
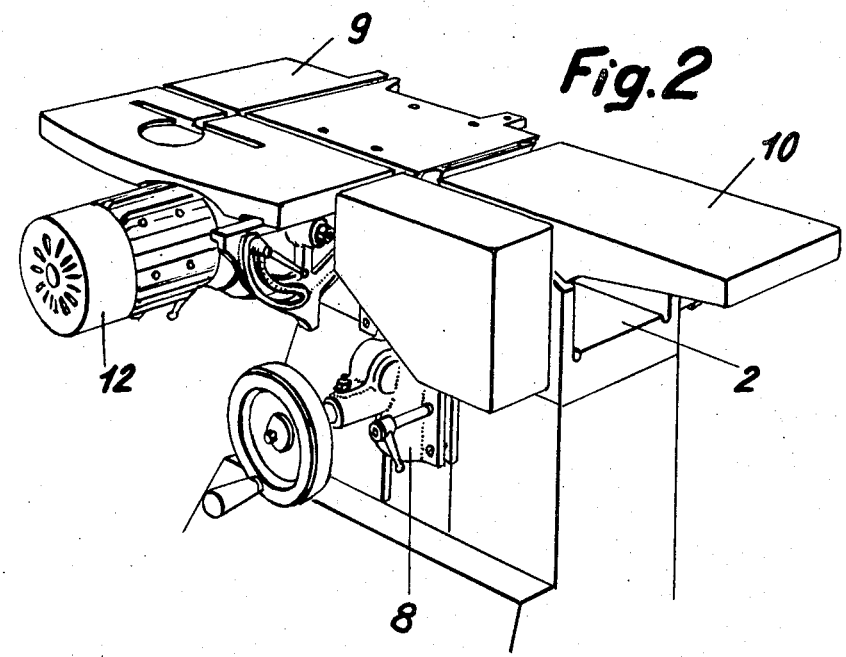
FIG. 2 is a perspective view on a smaller scale of the machine shown in its squaring-up, rough-planing, position.
Figure 3:
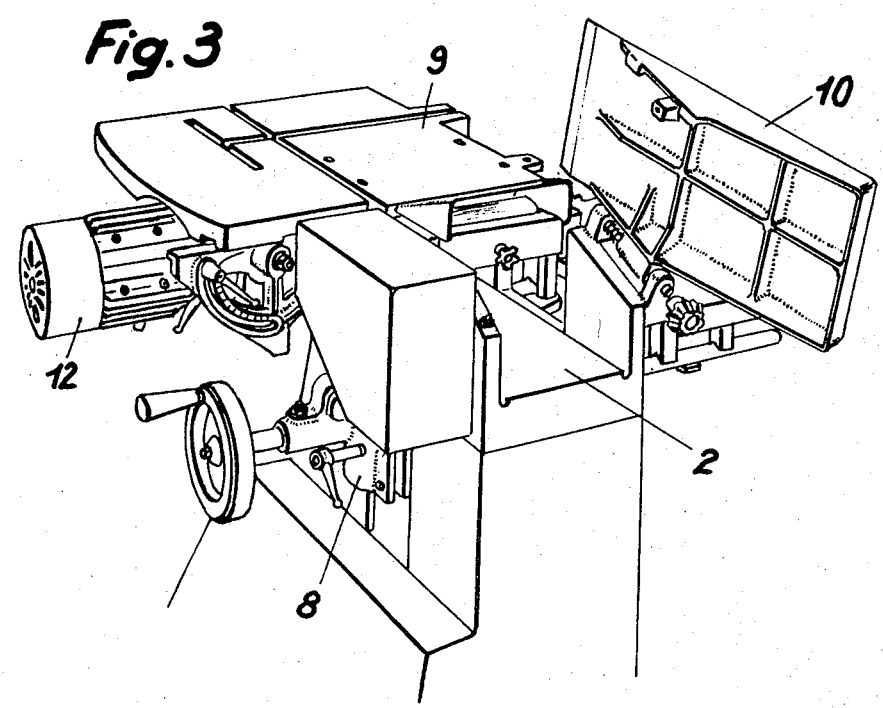
FIG. 3 is a view similar to FIG. 2, but showing the use of the machine as a planer.

From the position represented in FIG. 2, it is merely necessary to manipulate crank 22 to lower the mobile assembly, in order to bring the planing tool at a suitable distance from the lower table 2. When this tool is in bottom position, it is possible either to change the saw blade mounted on shaft 17, or to pivot platen 13 in order to position the said shaft vertically for a shaping operation with the adjustment of the saw or the positioning of the shaping iron being carried out by manipulating crank 22.

Figure 8:
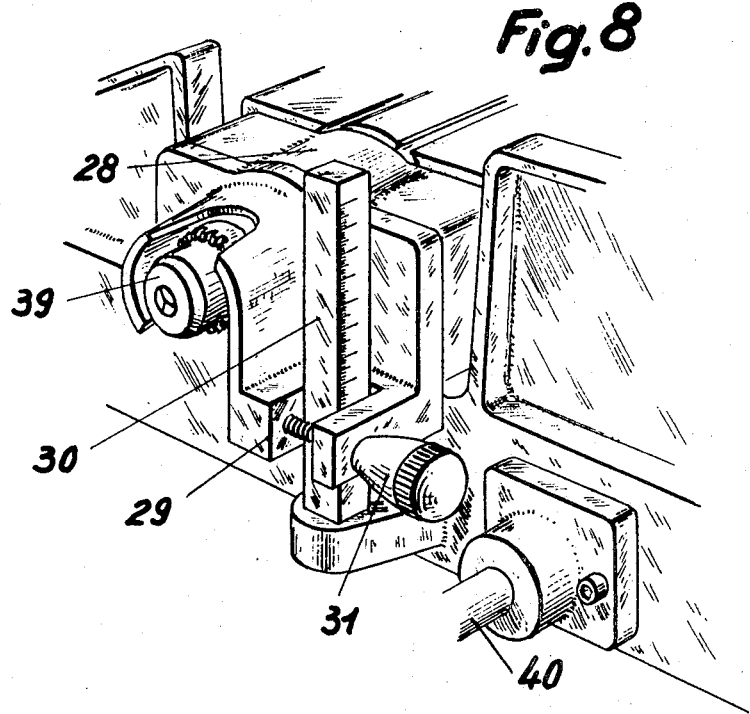
FIG. 8 is a partial view in perspective showing a device which remedies the overhang of the shaft supporting the squaring-up or planing tool, and adjusting the height of the latter.

Finally, it should be noted that the free end of shaft 4 can comprise a mandrel 39 or the like, receiving a mortising tool, horizontal supports 40, FIG. 8, making it possible to fix a removable table, FIG. 1, in the usual way, and making it possible to "mortise on the fly" or to attach an ordinary mortiser, with operation of the transverse and lateral displacements by two levers. The end of the shaft can be provided with any other woodworking device such as a disc sander, a "flexible," a wood lathe, and the like.

What I claim is:

1. A machine tool comprising, in combination, an electric motor, tool-holding shafts entrained alternately to said electric motor, two parallel tables, a mobile assembly supporting said shafts, means for displacing one of said shafts in planes parallel to one of said tables and means for moving the other of said shafts between a position perpendicular to the other of said tables to a position parallel to said other table.

2. A machine-tool comprising, in combination, two tool-holding shafts, two parallel tables, a mobile assembly supporting said shafts, a U-shaped frame whose middle portion constitutes one of said two tables, a second table integral with the ends of the lateral portions of said U-shaped frame, said U-shaped frame having transverse slot in which one of said shafts can be displaced, a bearing for said one shafts, a sleeve on said U-shaped frame, a column integral with said support bearing capable of sliding and being immobilized in said sleeve, an electric motor, a platen attached to said motor and an extension on said bearing supporting said platen art.ulated on said extension, said platen being capable of being tilted and immobilized in the required working position, having an axis of articulation perpendicular to that of said motor and to that of said one shaft.

3. A machine tool comprising, in combination, two tool-holding shafts, two parallel tables, a mobile assembly supporting said shafts, a U-shaped frame whose middle portion constitutes one of said two tables, a second table integral with the ends of the lateral portions of said U-shaped frame, said U-shaped frame having a transverse slot in which one of said shafts can be displaced, a bearing for one of said shafts, a sleeve on said U-shaped frame, a column integral with said bearing support, capable of sliding and being immobilized in said sleeve in an electric motor, a platen attached to said motor, an extension on said bearing supporting said platen articulated to said extension, said platen capable of being tilted and immobilized in the required working position, having an axis of articulation perpendicular to that of said motor and to that of said one shaft, and means on said platen supporting the bearing of the other of said shafts with the axis of said other shaft being parallel to that of said motor.

4. A machine-tool comprising, in combination, two tool-holding shafts, two parallel tables, a mobile assembly supporting said shafts, a U-shaped frame whose middle portion constitutes one of said two tables, a second table integral with the ends of the lateral portions of U-shaped frame, said U-shaped frame having a transverse slot in which one of said shafts can be displaced, a column, a bearing for one of said shafts, a sleeve on said U-shaped frame, integral with said bearing, capable of sliding and being immobilized in said sleeve, an electric motor, a platen attached to said motor, an extension on said bearing supporting said platen articulated on said extension, said platen being capable of being tilted and immobilized in the required working position, having an axis of articulation perpendicular to that of said motor and to that of said one shaft, and means on said platen supporting the bearing of other of said shafts with the axis of said other shaft being parallel to that of said motor, while the face for attachment of the latter, perpendicular to its axis, is articulated on said platen at a point on its perimeter, by means of an axis parallel to that of said motor.

5. A machine tool according to claim 4, including a belt entraining one of said shafts, said platen having a circumferential opening which permits immobilizing said face when said belt entraining one of said two shafts is tensioned.

6. A machine-tool according to claim 4, including a bearing in which the free end of said one shaft can pivot said bearing having a fork, a graduated, vertical guide having said fork engaged thereon and means for locking said fork on said guide.

7. A machine tool according to claim 4, in which said sleeve receiving the column has a longitudinal slot and means for clamping said sleeve on said column.

8. A machine tool according to claim 4, including a radial extension of said sleeve, a shaft rotatably mounted in said sleeve extension, a crank for rotating said shaft, said shaft having, at its end, an endless screw, a tangential pinion meshing with said endless screw, and a rack on said column, meshing with said pinion.

* * * * *